United States Patent [19]
Smith et al.

[11] Patent Number: 5,334,981
[45] Date of Patent: Aug. 2, 1994

[54] AIRBORNE METAL DETECTING RADAR

[75] Inventors: Carter C. Smith, San Diego; John B. Gehman, La Jolla, both of Calif.

[73] Assignee: Hughes Missile Systems Company, Los Angeles, Calif.

[21] Appl. No.: 865,572

[22] Filed: Apr. 9, 1992

[51] Int. Cl.$^5$ .............................................. G01S 13/04
[52] U.S. Cl. ........................................ 342/27; 342/188
[58] Field of Search .................................. 342/27, 188

[56] References Cited

U.S. PATENT DOCUMENTS 3,500,395 3/1970 Foster et al. ........................... 342/27
3,614,778 10/1971 Graham et al. .................. 342/188 X

*Primary Examiner*—T. H. Tubbesing
*Attorney, Agent, or Firm*—Randall M. Heald; Charles D. Brown; Wanda K. Denson-Low

[57] ABSTRACT

Method and arrangement for an airborne radar system particularly adapted to detect large metal targets that are concealed from the air by camouflage or natural foliage. The arrangement includes an antenna that transmits a continuous wave electromagnetic signal having a selectable frequency that preferably has a wave length generally twice the length of an anticipated target and which is carried by a flying vehicle. The frequency of the transmitted signal is chosen to provide maximum penetration of the camouflage or natural foliage and maximum re-radiation from a metal target. Receivers connected to an in-line receiving antenna and to a crossed receiving antenna carried by a flying vehicle detect the radiation that is reflected from the terrain and a target with the same polarization as that transmitted. The co-linear antenna and receiver respond to the reflected radiation while the cross-polarized antenna does not detect this reflected radiation. However, a metal object on the ground re-radiates cross polarized electromagnetic waves in proportion to their angular orientation and lateral distance to the transmitting antenna so that a metal target is detected by observing the output differences for the two receivers.

22 Claims, 3 Drawing Sheets

AIRBORNE METAL DETECTING RADAR

BACKGROUND OF THE INVENTION

1. Field of the Invention

This invention relates generally to an improvement in the field of airborne metal detecting systems and more particularly, but not by way of limitation, to a method and arrangement for transmitting a radar signal from a flying vehicle and detecting radiation reflected from a camouflaged metal target by receivers connected to antennas carried on a flying vehicle.

2. Description of the Prior Art

In the art of directing a cruise missile or a bomb from a flying vehicle a difficulty has arisen when a large metal target such as a tank or a missile launcher has been concealed from visual sight by camouflage or by natural foliage cover. When such large metal target has been so concealed the systems which have been heretofore used for the detection of targets and the direction of a cruise missile or other bomb to the target have been relatively ineffective due to the success of such concealment. Thus, a real need has existed for a system that will effectively penetrate such concealment and detect such metal targets. It is believed that the method and arrangement of the present invention provides a significant advance in the detection of metal targets and the vectoring of missiles and bombs to such targets.

The prior art patents do not reveal any methods or arrangements that appear to be of primary interest. U.S. Pat. Nos. 3,823,402; 3,829,861; and 4,730,194 are interest only in the fact that they disclose trailing wire antennas employed with flying aircraft. However, such patents are only directed to communication systems and are not utilized in any respect with a airborne metal detection radar system or any method employing such. U.S. Pat. No. 3,096,515 discloses a three antenna system but such three antennas are used only in cooperation with a Doppler navigation system for controlling a moving aircraft and measuring its motion. This patent is in no respect directed to a method and arrangement for an airborne metal target detecting radar system.

SUMMARY OF THE INVENTION

It is therefore an object of this invention to provide an airborne metal target detecting radar system which provides maximum penetration of camouflage or natural foliage concealment of a metal target and maximum re-radiation of a signal from such a target for processing with minimum complexity and cost.

This and other objects are met in accordance with the teachings of this invention by providing a method and arrangement for detecting a metal target which may be camouflaged or concealed by natural foliage from a flying vehicle which includes an antenna carried by a flying vehicle for transmitting an electromagnetic signal. A first receiving antenna means is carried by the flying vehicle for receiving the transmitted electromagnetic signal reflected upwardly from the terrain and the target. A second receiving antenna is carried by the flying vehicle and arranged orthogonally to the first antenna for receiving the transmitted electromagnetic signal that is reflected from the terrain and the target. Means are coupled to the first and second antenna receiving means for processing the received signals to provide information that is a function of target size, orientation of the target to the transmitted wavefront and the distance between the target and the flying vehicle. The frequency of the electromagnetic wave signal is chosen to provide maximum penetration of camouflage or natural foliage and maximum resonance with a metal target. Typically, the frequency of such signal will fall in the range of 2–30 MHZ. with 7.5 MHZ. being chosen for a large metal object, such as a truck, which has a general length of 20 meters since it is desirable to tune the frequency of the electromagnetic signal to provide a wavelength that is two times the target size. The frequency of the electromagnetic signal may be scanned over a predetermined range in a manner to specifically detect metal objects of varying sizes or may be set at a predetermined frequency to detect a particular target such as a missile launcher.

The transmitting antenna, which is preferably a trailing wire antenna, transmits the radiation toward the ground from which it is reflected by the terrain and any metal object. The first receiving antenna which is oriented to receive with the same polarization sense as the transmitted signal receives radiation reflected from the terrain and the target while the second receiving antenna receives cross-polarized radiation reflected from the terrain and the target. Suitable receivers and processors are associated with the antennas for separating the target signal from the signal associated with the terrain and foliage and provide an output that signifies a metallic target. The principal target detection signal consists of an amplitude modulated waveform, the frequency of which corresponds to phase changes resulting from changing radiation path distance as the aircraft flies over or by the target.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENT

Figure 1:
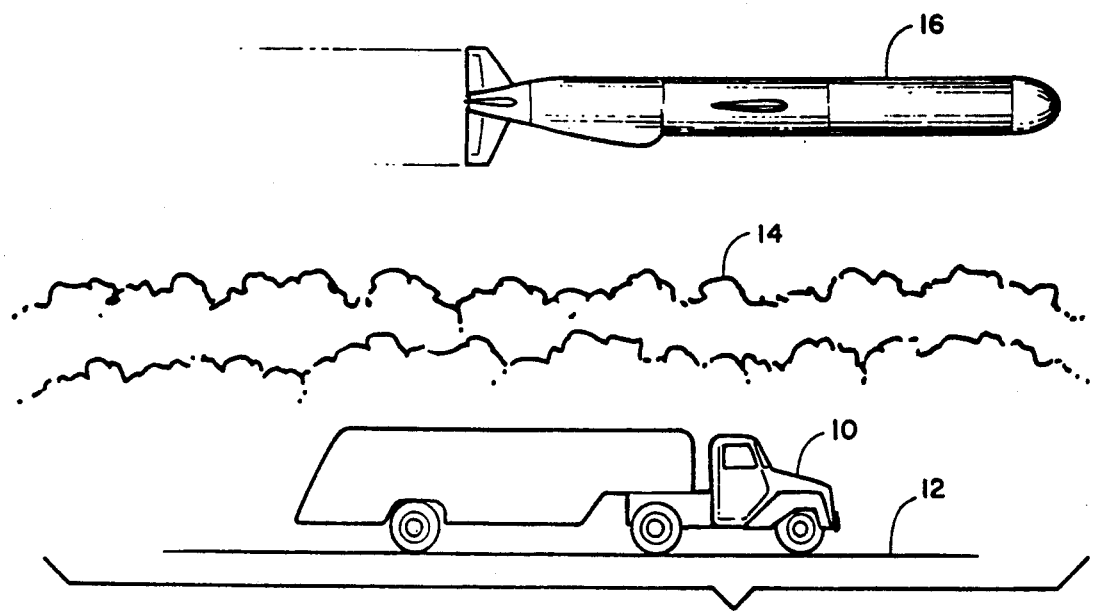
FIG. 1 is a diagrammatic view illustrating the problem of a metal target, such as a truck, concealing itself from a flying vehicle, such as a cruise missile, by hiding under foliage cover.

Referring now to the drawings in detail, and in particular to FIG. 1, reference character 10 generally designates a metal target such as truck 10 that is positioned on the ground 12 under foliage cover 14 or other camouflage to escape detection from a flying vehicle such as a cruise missile 16 which is attempting to locate and destroy the target 10. This is the problem presented when large metal objects are located on the ground and hidden by foliage. Large trucks and other military vehicles can take refuge under forest canopies or camouflage and thereby escape detection by conventional airborne reconnaissance sensors.

Figure 2:
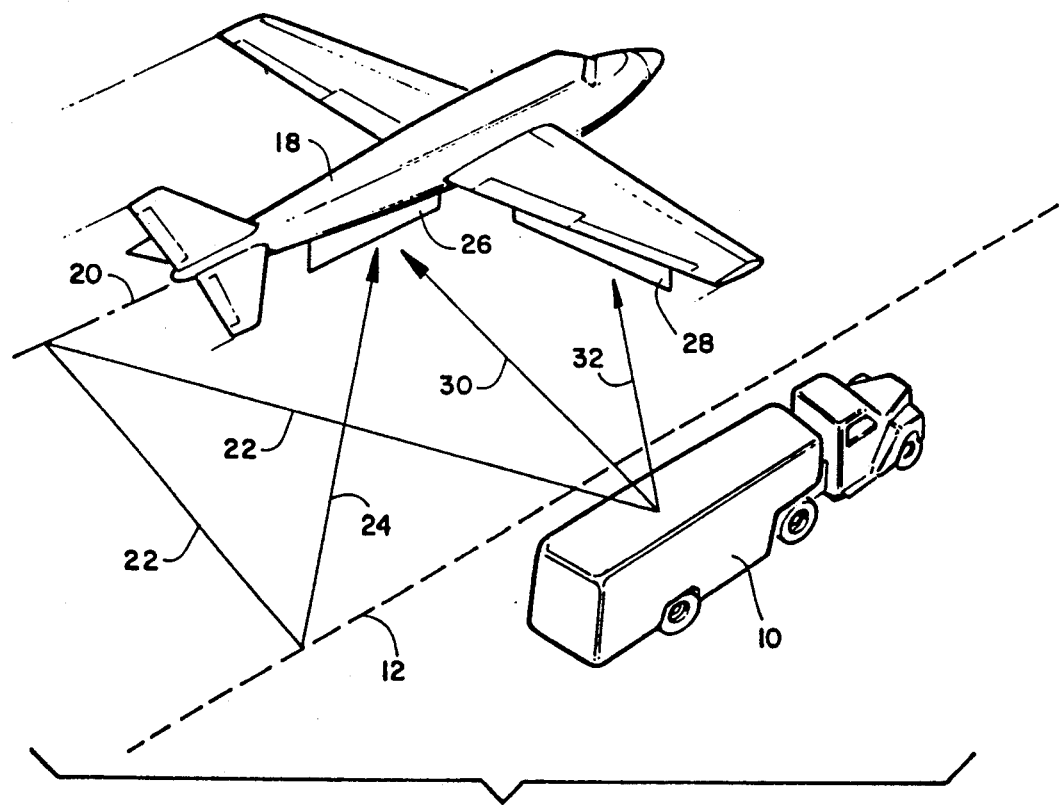
FIG. 2 is a diagrammatic view illustrating the radar system of the present preferred embodiment of the invention which is carried by a flying vehicle for detection of a large metal target.

Referring now to FIG. 2, a preferred embodiment of the invention is illustrated. A flying vehicle such as an aircraft 18 is provided with a suitable antenna 20 for transmitting a suitable electromagnetic wave in the high frequency range. The antenna 20 is preferably a trailing wire antenna as illustrated which is isolated from the body of the flying vehicle 18. Radiation from the antenna 20 is transmitted toward the ground 12 as per line 22 and is reflected from the ground 12 as line 24. For purposes of illustration, the target 10 is shown as being offset from the flying vehicle 18. The radiation 24 which is reflected from the terrain 12 is received by a first receiving antenna 26 that is carried by the flying vehicle 18 in an orientation that is in-line with that of the transmitting antenna 20 to reduce direct pick-up of the transmitted signal and permit like-polarization reception. The first receiving antenna 26 is preferably a dipole antenna.

A second receiving antenna 28, which is preferably a dipole antenna, is carried by the flying vehicle 18 in an orientation that is orthogonal to that of the first receiving antenna 26. Radiation transmitted from the trailing wire antenna 20 to the terrain beneath the antenna 20 is reflected upwards with the same polarization as that transmitted. Thus, the in-line or like polarized first receiving antenna 26 responds to this reflected radiation 26 while the orthogonal cross-polarized antenna 28 does not. However, radiation 22 from the trailing wire antenna 20 is re-radiated from the target 10 as radiation 30 which is received by the like-polarized antenna 26 and as radiation 32 that is received by the cross-polarized antenna 28. The metal target 10 will re-radiate both like-polarized and cross-polarized electromagnetic waves that are a function of target size, orientation of the target to transmitted wavefront and the distance between the target 10 and the flying vehicle 18. Monopole antennas or other suitable antennas can also be used for the first and second receiving antennas 26 and 28.

Figure 3:
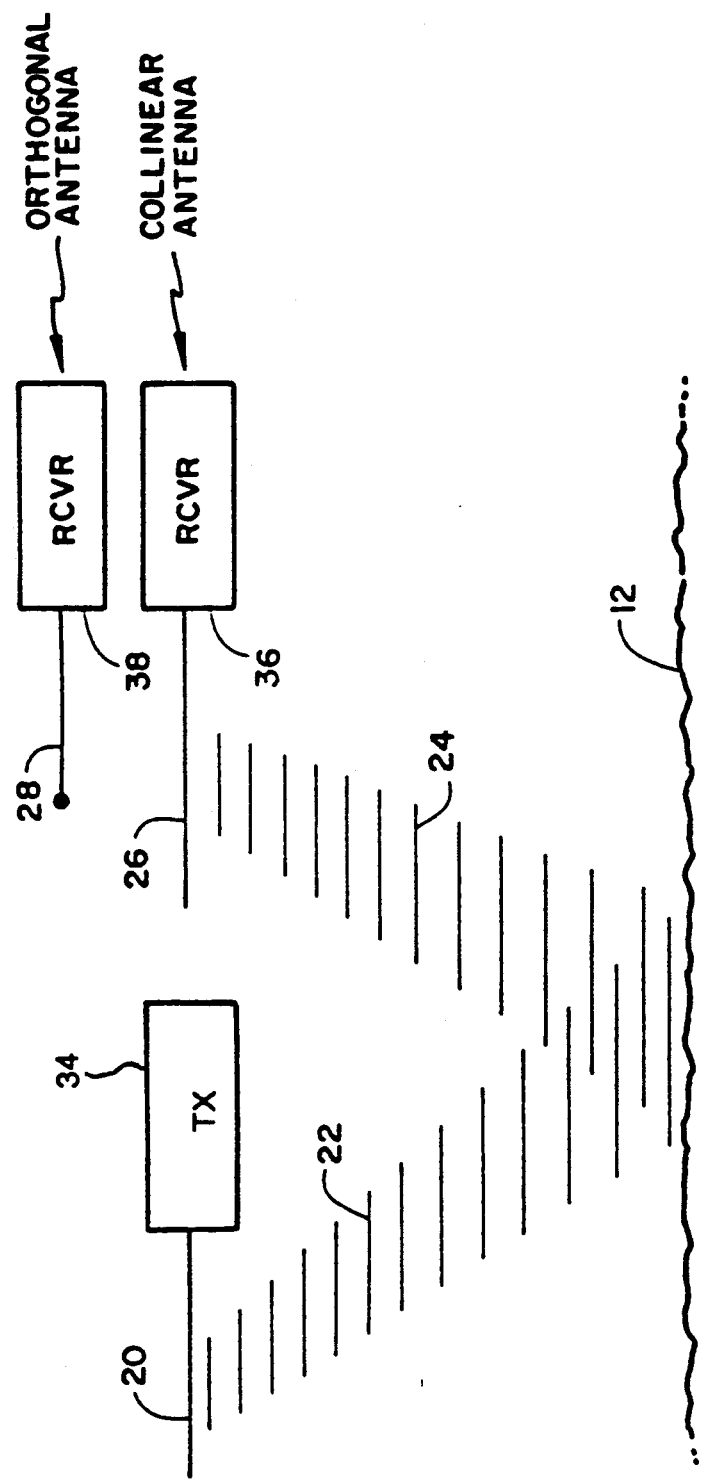
FIG. 3 is a schematic view illustrating the propagation of a polarized electromagnetic wavefront being reflected from the ground.

Referring now to FIG. 3, the radar response to ground reflections will be illustrated. The horizontal transmit antenna 20 is coupled to a suitable transmitter 34 and transmits a continuous wave radar signal 22 having a fixed polarization toward the ground 12. The reflected radiation 24 from the ground 12 is received by the collinear antenna 26 which is coupled to a suitable receiver 36 for further processing as will be hereinafter described. The reflections 24 from the ground 12 are the same polarization as transmitted by antenna 20. The reflected radiation 24 sensed by collinear antenna 26 is not sensed by orthogonal antenna 28 which is also coupled to a suitable receiver 38. Radiation sensed by the orthogonal antenna 28 is therefore associated with reflections from non-terrain like sources. Thus, the antenna pair 26 and 28 provide the means to discriminate between terrain reflections (i.e. clutter) and non-terrain reflections.

Figure 4:
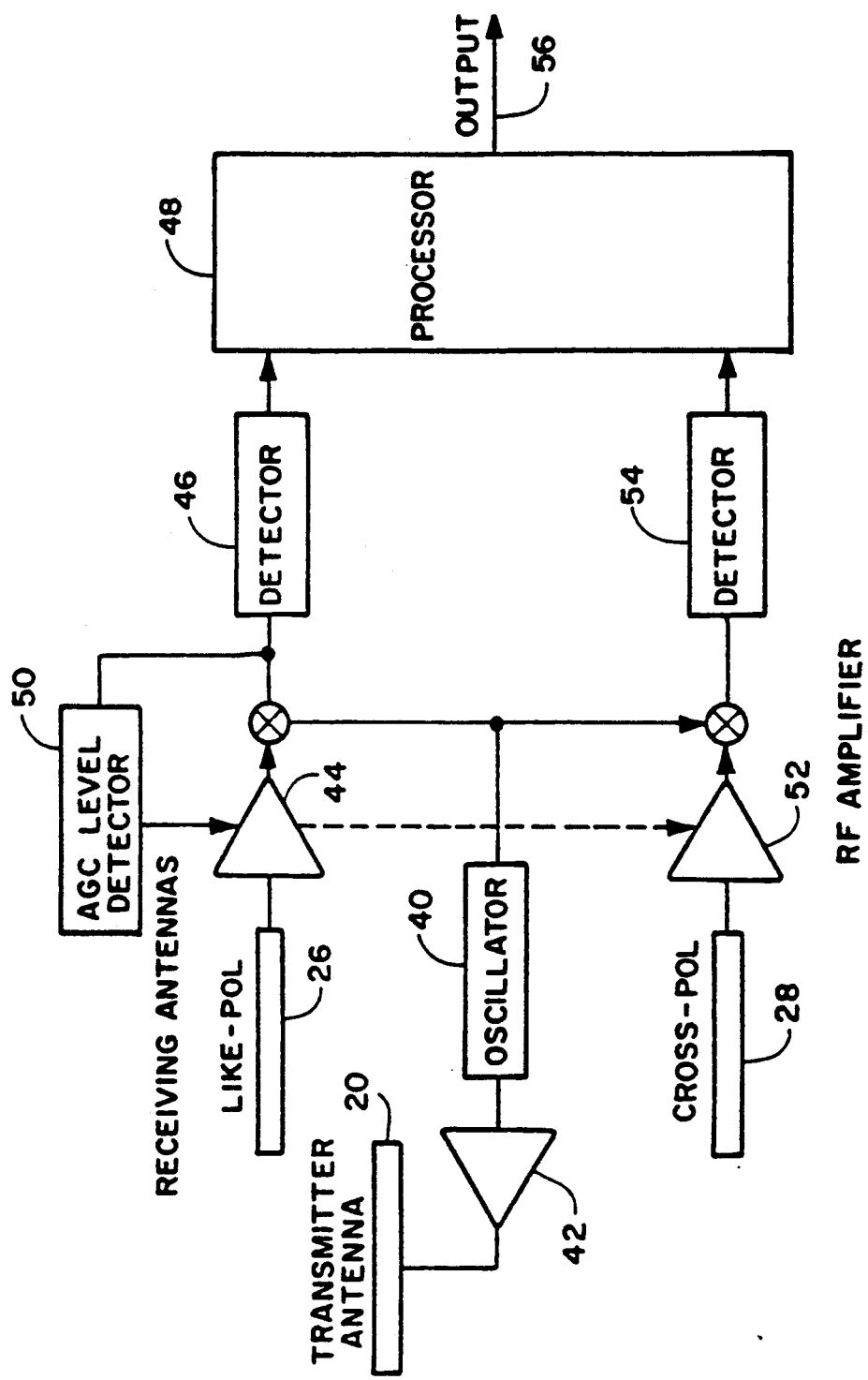
FIG. 4 is simplified block diagram of a presently preferred embodiment of the radar system of the present invention.

In FIG. 4, a block diagram of the radar system of the present invention is illustrated. A suitable oscillator 40 is coupled to a suitable amplifier 42 that is in turn coupled to the transmitter antenna 20. The like-polarized antenna 26 is coupled to a suitable amplifier 44 that provides an output to a suitable detector 46 that in turn is connected to a processor 48. A suitable automatic gain control (AGC) detector 50 is connected from the output of the amplifier 44 back to the amplifier 44 in a known manner.

The cross polarized antenna 28 is coupled to a suitable amplifier 52 which is in turn connected to a suitable detector 54 which is coupled to the processor 48 that provides an output 56. The amplifiers 44 and 52 are typically conventional RF amplifiers. The oscillator 40 also is mixed with the outputs of the amplifiers 44 and 52.

In operation, a target 10 is attempting to escape detection from a flying vehicle, such as the aircraft 18. The aircraft 18 transmits an electromagnetic wave in the form of a continuous wave radar signal. The oscillator 40 generates an electromagnetic wave having a frequency that provides maximum penetration of the natural foliage or other camouflage and maximum re-radiation by the anticipated metal target. Typically, this frequency range would be in the high frequency range of 2-30 MHZ. If the target were to be about 20 meters in length, then the frequency would be chosen so that the wavelength of the radiation would be twice the length of target or about 40 meters. This corresponds to a frequency of 7.5 MHZ. For maximum effect, the lengths of the trailing wire antenna 20 and the receiving antennas 26 and 28 would be tuned to this frequency. Some vehicles may constitute a complex target and therefore the resonant frequencies may be affected by additional factors.

Radiation transmitted from the trailing wire antenna 20 to the ground 12 beneath the antenna 20 is reflected upwards with the same polarization as that transmitted. Thus the like-polarized antenna 26 and the receiver 36 and the cross-polarized antenna 28 with a separate receiver 38 respond to the reflected radiation, but the cross-polarized antenna 28 and receiver 38 respond to a lesser extent. Heterodyne and low-pass or band-pass filtering are employed by detectors 46 and 54 to produce a suitable analog signal representative of terrain and target reflections. A digital or analog processor 48 uses the output from one or both detectors to enhance the ratio of target-to-clutter signals. Processing operation may include, but are not limited to, comparison, normalization, filtering, thresholding, correlation, velocity compensation, doppler pattern recognition and pattern recognition for target identification purposes.

It is also contemplated that the oscillator 40 could be operated over a frequency range selected to maximize the detection of metal targets of various sizes. For example, dipole like targets with dimensions of 20 meters and 5 meters will resonate at frequencies of 7.5 and 30 MHZ respectively. The transmitter 34 and the receivers 36 and 38 may be stepped or scanned between these two frequencies.

It would be also be within the scope of this invention to employ only one receiving channel consisting of the cross-polarized antenna 28, amplifier 52, detector 54 and processor 48 to produce the processed output 56.

For maximum effects, the distance between the radar system of the present invention and the metal targets should be made as small as feasible under the circumstances. Thus, an aircraft conducting a search for a particular vehicle should be at as low an altitude as possible. The upper limit to flight altitudes would be a function of transmitter power and receiver sensitivity. While the preferred embodiment of the invention shows the transmitting antenna and separate crossed receiving antennas employed on the same flight vehicle, it is within the scope of the invention to dispose the transmitting antenna on one flight vehicle and to dispose the crossed receiving antennas on a second flight vehicle.

Thus, there has been shown a unique method and arrangement for detecting a metal target that has been concealed under vehicle. The invention employs an airborne metal target radar system which utilizes a transmitting trailing wire antenna to transmit a radar signal that is reflected from the terrain and the metal target. Collinear and orthogonal antennas with receivers and processor provide a transformed signal that is a function of target size, orientation of the target to the transmitted wavefront and the distance between the target and the flying vehicle.

Numerous changes may be made in the above described arrangement and the different embodiments of the invention may be made without departing form the spirit thereof, therefore, it is intended that all matter contained in the foregoing description and in the accompanying drawings shall be interpreted as illustrative and not in a limiting sense.

What is claimed is:

1. A radar system for detecting a metal target which may be camouflaged or concealed by natural foliage from an airborne flying vehicle and comprising:
   an antenna carried by a flying vehicle for transmitting an electromagnetic signal,
   first receiving antenna means carried by the flying vehicle for receiving the transmitted electromagnetic signal selected from the terrain and the target,
   second receiving antenna means carried by the flying vehicle and arranged orthogonally to the first antenna means for receiving the transmitted electromagnetic signal reflected from the target, and
   means coupled to the first and second receiving antenna means for processing the received signals to provide information as to the presence of a metal target.

2. The radar system of claim 1 wherein the transmitting antenna is a trailing wire antenna which extends rearwardly from the flying vehicle during flight.

3. The radar system of claim 1 which further includes a continuous wave radio frequency oscillator coupled to the transmitting antenna.

4. The radar system of claim 3 wherein the oscillator comprises means for generating a signal having a frequency that penetrates foliage of the terrain and which interacts with a metal target to provide a reflected signal.

5. The radar system of claim 4 wherein the oscillator comprises means for generating a signal having a frequency range of 2-30 MHZ.

6. The radar system of claim 4 wherein the oscillator comprises means for generating a signal having a frequency range of approximately 7-8 MHZ.

7. The radar system of claim 1 wherein the first antenna means is carried by the flying vehicle in an orientation that is in-line with the transmitting antenna.

8. The radar system of claim 1 wherein the transmitting antenna is isolated from the flying vehicle.

9. The radar system of claim 1 wherein the first and second antenna means are dipole antennas.

10. The radar system of claim 1 wherein the antenna to transmit the electromagnetic signal is carried by a first flying vehicle and the first and second receiving antenna means and the signal processing means coupled to said first and second receiving means are carried by a second flying vehicle.

11. A method to detect a metal target that is camouflaged or concealed by natural foliage which comprises the steps of:
    illuminating a metal target and surrounding terrain with an electromagnetic signal having a frequency in the band of 2 to 30 MHz and transmitted by an antenna carried by a flying vehicle,
    receiving the transmitted signal re-radiated from the metal target with an antenna also carried by the flying vehicle and oriented orthogonally to the in-line antenna, and
    processing the re-radiated signals received from the metal target and the terrain by the antennas to develop data indicative of the presence of a metal target.

12. The method of claim 11 wherein step of illuminating includes the step of radiating an electromagnetic wave having a wave length of twice the length of the metal target.

13. The method of claim 11 wherein the processing step includes the step of detecting the signals re-radiated from the target from the clutter re-radiated from the target from the clutter re-radiated by the terrain surrounding the target.

14. The method of claim 13 wherein the processing step also includes detecting a metal target by observing the output difference from the detected signals re-radiated from the target and separated from the clutter.

15. The method of claim 11 wherein the step of illuminating includes the step of radiating an electromagnetic signal having a frequency that is operated over a predetermined range selected to maximize re-radiation from targets having a plurality of predetermined sizes.

16. The method of claim 11 wherein the step of illuminating includes the step of radiating an electromagnetic signal operable at predetermined frequencies within the predetermined range for selectable periods of time.

17. The method of claim 11 wherein the electromagnetic signal is transmitted from a first flying vehicle and the receiving step and the processing step are performed on a second flying vehicle that is flying in a predetermined orientation relative to the first flying vehicle.

18. The method of claim 11 wherein the frequency of the transmitted electromagnetic signal is chosen to maximize foliage penetration and the detection of large metal objects.

19. A method to detect a metal target that is camouflaged or concealed by natural foliage which comprises the steps of:
    illuminating a metal target and surrounding terrain with an electromagnetic signal transmitted by a transmitting antenna carried by a flying vehicle,
    receiving the transmitted signal re-radiated from the metal target with
    a first antenna carried by the flying vehicle, and
    a second antenna carried by the flying vehicle and oriented orthogonally to the first antenna, and
    processing the re-radiated signals received from the metal target and the terrain by the first and second antennas to develop data indicative of the presence of a metal target.

20. The method of claim 19, wherein the step of illuminating includes the step of radiating an electromagnetic signal having a frequency in the band of 2-30 MHz.

21. The method of claim 19, wherein the step of illuminating includes the step of radiating an electromagnetic signal having a wavelength twice that of an anticipated metal target.

22. The method of claim 19, wherein the step of illuminating includes the step of radiating an electromagnetic signal whose wavelength is intentionally varied with time over a predetermined range.

* * * * *